March 2, 1954  A. G. PERKINS  2,670,753
CONTROL UNIT FOR MILKING MACHINES
Filed April 13, 1949  4 Sheets-Sheet 1

FIG. 2.a.

Inventor
Albert G. Perkins
Walter P. Geyer
By
Attorney

March 2, 1954 A. G. PERKINS 2,670,753
CONTROL UNIT FOR MILKING MACHINES
Filed April 13, 1949 4 Sheets-Sheet 2

Inventor
Albert G. Perkins
By Walter P. Guyer
Attorney

March 2, 1954   A. G. PERKINS   2,670,753
CONTROL UNIT FOR MILKING MACHINES
Filed April 13, 1949   4 Sheets-Sheet 3

Inventor
Albert G. Perkins
Walter P. Guyer
Attorney

Patented Mar. 2, 1954

2,670,753

UNITED STATES PATENT OFFICE 2,670,753

CONTROL UNIT FOR MILKING MACHINES

Albert G. Perkins, Grand Island, N. Y.

Application April 13, 1949, Serial No. 87,163

10 Claims. (Cl. 137—455)

This invention relates generally to an automatic control for milking machines but more particularly to a control unit for causing the automatic dropping of the teat cups from the cow as the respective quarters of the cow's bag are milked out and thereby prevent injury to the cow when the machine is left on too long.

It has for its primary object to provide a self-contained device or appliance of this character which is adapted to be interposed in each of the milk flow connections of a milking machine, which is so designed as to automatically respond and cut off the vacuum in the milk flow connection to the teat cup when the surge of milk from the companion quarter of the cow's bag substantially ceases to thereupon cause that cup to be released and drop by gravity from the cow, and which is further so designed as to be inoperative to become released from the cow's teat when the cow temporarily lets down on her milking.

Another object of the invention is to provide an individual teat cup releasing device for milking machines having simple and reliable means for governing the contraction of the interposed milk flow tube and for assuring the sealing of the vacuum to the teat cup at such time as the flow of milk from such companion cup substantially ceases.

Other features of the invention reside in the construction and arrangement of parts hereinafter described and particularly pointed out in the appended claims.

Figure 1:
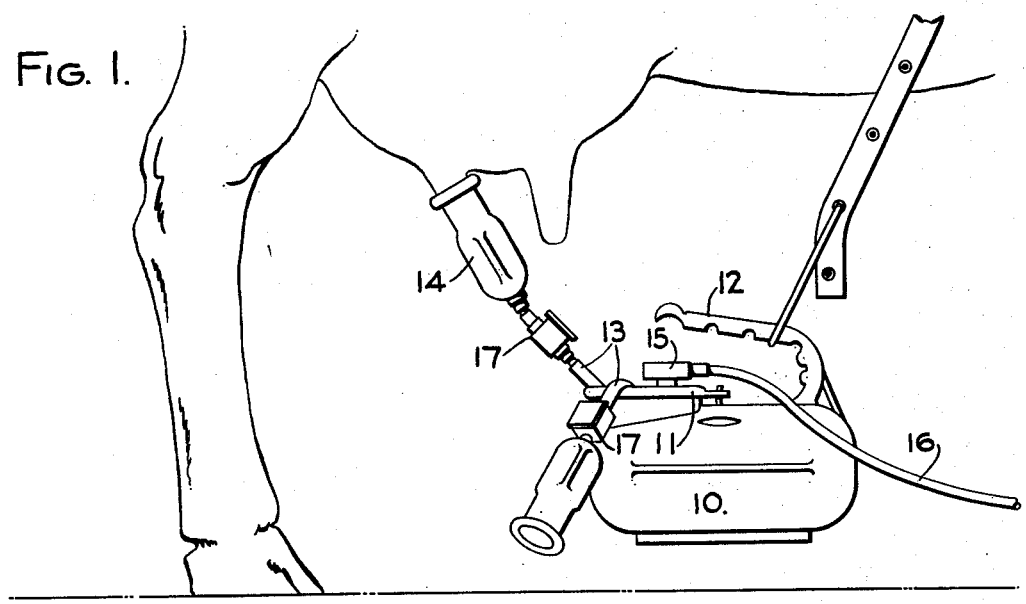
Figure 2:
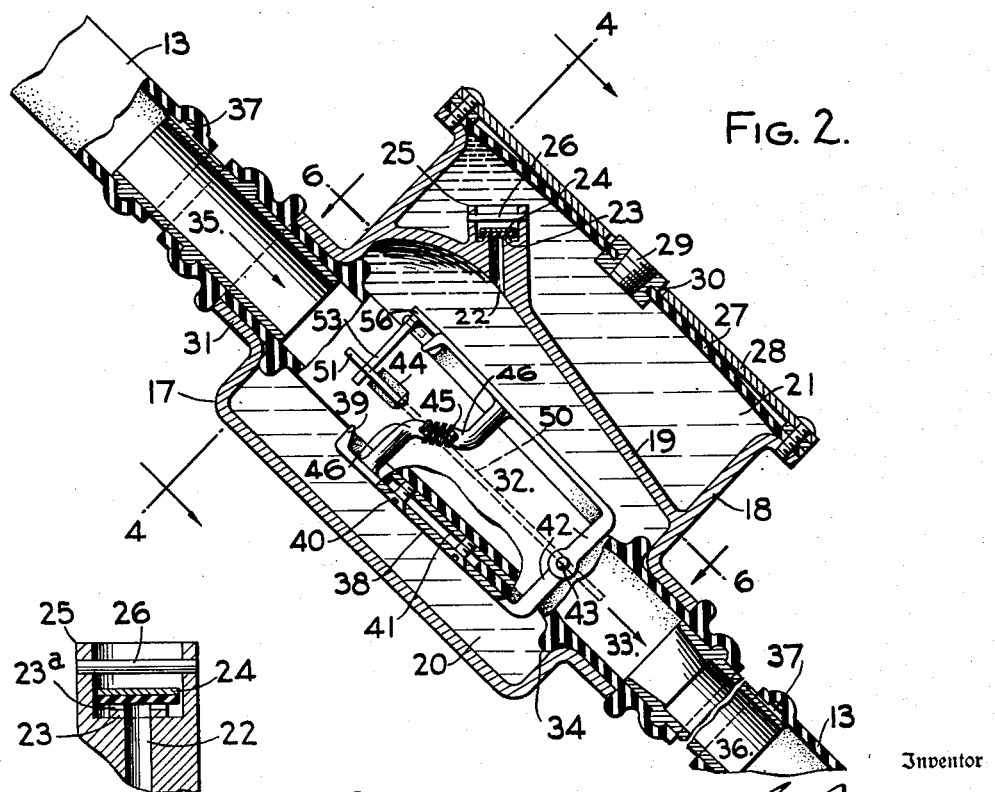
Figure 3:
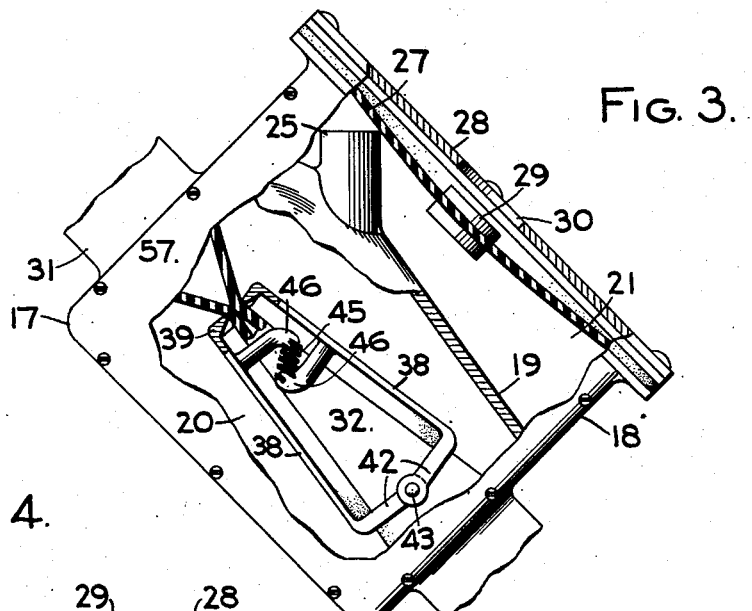
Figure 4:
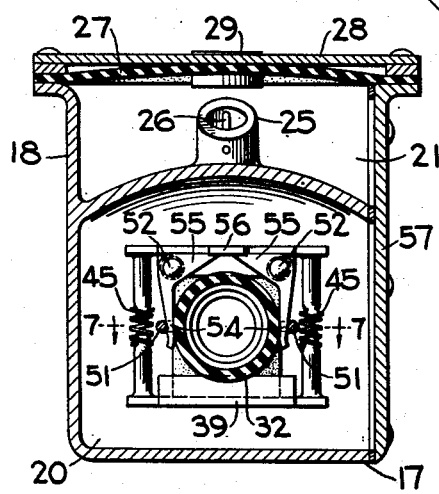
Figure 5:
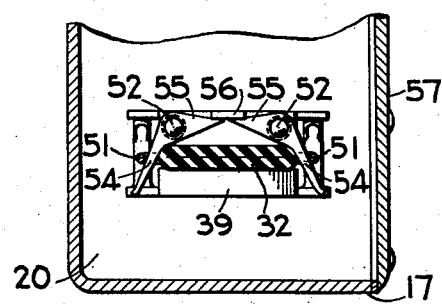
Figure 6:
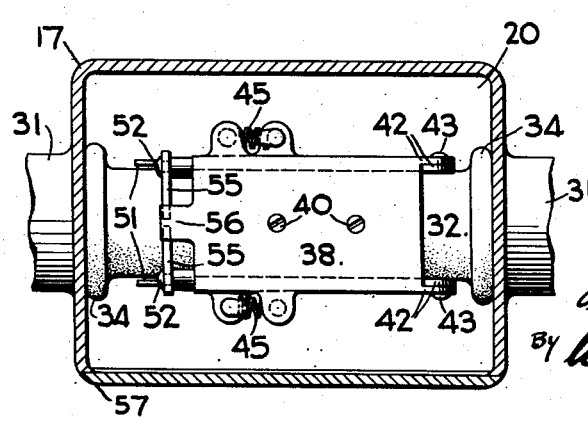
Figure 7:
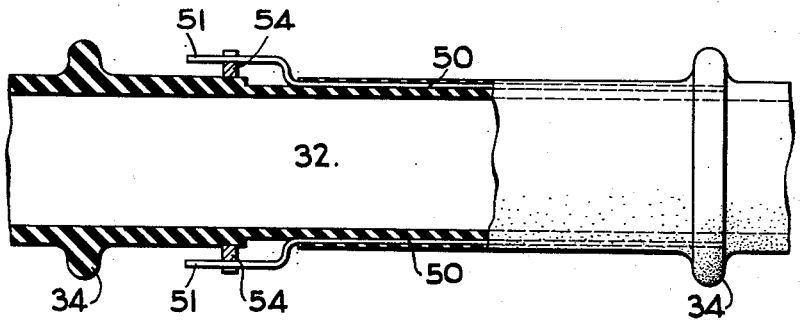
Figure 8:
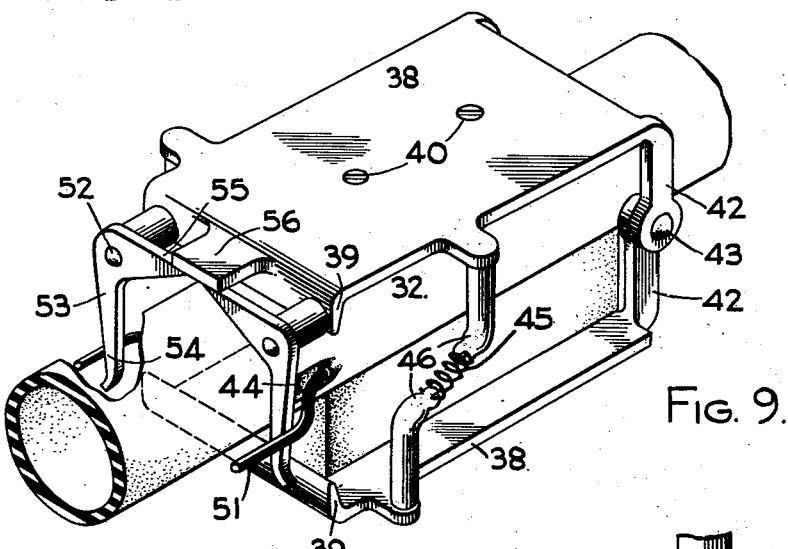
Figure 12:
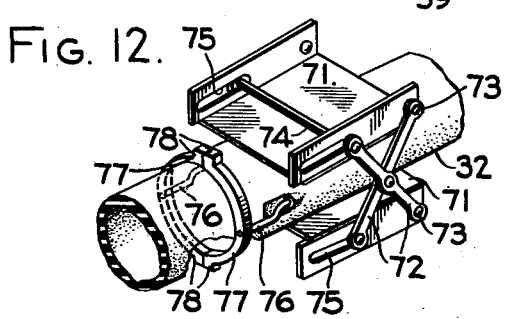
Figure 9:
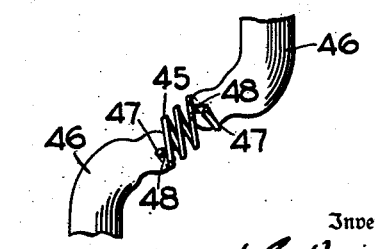
Figure 10:
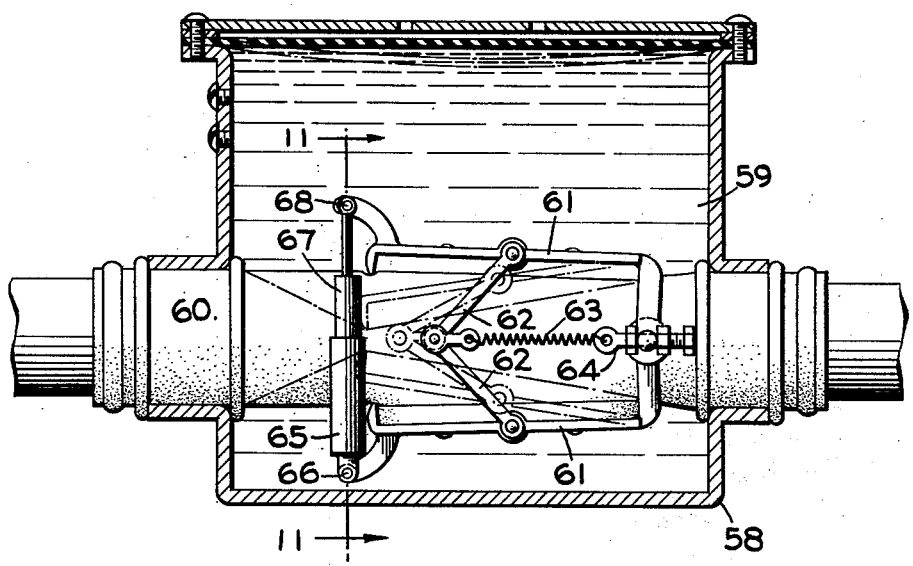
Figure 11:
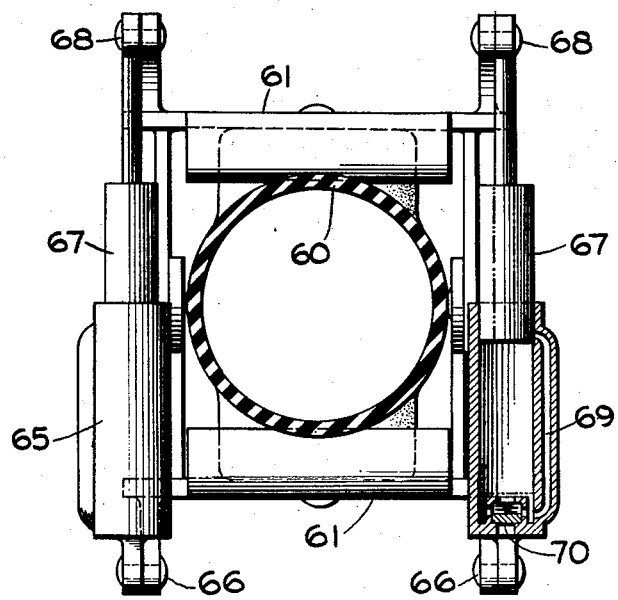

In the accompanying drawings:

Figure 1 is a side view of a milking machine suspended in operative relation to the cow and showing my control device in the teat cup connections thereof, one of the cups being shown as having been automatically dropped from the cow after the corresponding quarter had been milked out. Figure 2 is an enlarged vertical longitudinal section of one of the devices in a milking position. Figure 2a is an enlarged fragmentary section of the control valve shown in Figure 2. Figure 3 is a section similar to Figure 2, but partly in elevation with certain parts omitted and showing the tube-section in a shut-off position. Figure 4 is a cross section taken on line 4—4, Figure 2. Figure 5 is a similar fragmentary section showing the parts in the shut-off position corresponding to Figure 3. Figure 6 is a horizontal section taken on line 6—6, Figure 2. Figure 7 is a detached enlarged sectional elevation of the contractible tube section of the device with other parts thereof omitted, the sectional portion being taken in the plane of line 7—7, Figure 4. Figure 8 is an enlarged detached perspective view of one of the tube sections or valve units of the device with parts cut away. Figure 9 is an enlarged fragmentary side view of one of the yielding connections associated with the valve unit of the device. Figure 10 is an enlarged vertical section, similar to Figure 2, of a modified form of the invention. Figure 11 is an enlarged cross section taken on line 11—11, Figure 10. Figure 12 is a perspective view of a modified form of valve unit.

Similar characters of reference indicate corresponding parts throughout the several views.

By way of example, I have shown my teat-dropping control device or controlled quarter milker applied to a well known type of pulsating milking machine wherein 10 indicates the milk-receiving can having a cover 11 and bail 12, the cover having milk-intake tubes radiating therefrom and each connected by a flexible conduit or hose connection 13 having a teat cup 14 at its free end for detachable connection to one of the cow's teats. Also applied to the cover is the customary pulsator 15 which is connected by a hose 16 to the suction source, not shown. Interposed substantially axially in each hose connection 13 is one of my control units, indicated generally by the numeral 17, through which the milk flows from the cow to the can, and which performs as a valve, as each quarter of the cow's bag is milked out, to automatically shut off the vacuum thereto and cause the companion teat cup to drop from the cow, as depicted in Figure 1, to effectually prevent injury to the cow from overmilking, and subsequently cause the automatic restoration of the unit to its initial position.

In the preferred embodiment of my invention shown in Figures 1-9 of the drawings, each control unit consists of a hollow body or casing 18 having a partition 19 therein dividing it into a lower chamber 20 and an upper chamber or reservoir 21, each adapted to be filled with a substantially constant viscosity fluid, such as a synthetic oil and with the partition provided with a port 22 including a valve seat 23 controlled by a check valve 24, whereby communication between these chambers is established and automatically controlled in accordance with a change in vacuum. The valve seat has a slit 23a therein normally bridged by the bottom face of the valve to provide a by-pass or capillary vent at all times between the two chambers so that the fluid may flow in either direction from one chamber to the other in accordance with the vacuum condition in the milk hose 13 and control unit during the milking operation. In its pendant position between the cow and can, this control unit assumes a more or less inclined position, as shown in Figures 1 and 2 for example, and the port 22 is substantially vertical with the valve 23 guided for free vertical displacement in a tubular extension 25 rising from the partition 19 and having a pin 26 extending diametrically across the same to limit the upward displacement of the valve in its open position. This valve is normally closed but is free to open in response to a pressure flow of the fluid from the lower chamber to the upper chamber. The top wall of the chamber 21 is provided with a displaceable diaphragm 27 secured at its marginal edges to the flanged top of the casing 18 and normally covered by a cover plate 28. This diaphragm has a filling opening normally sealed closed by a plug 29 for facilitating the charging of the body-chambers with fluid and the cover plate has an opening 30 therein alined with and into which this plug may protrude for access.

At its opposite ends and substantially centrally of its lower chamber 20, the casing has alined nipples 31 for supporting the intake and discharge ends of a flexible, contractible tube-like conduit section or valve member 32 extending from end to end of such chamber in fluid-sealed relation thereto and in interposed milk flow communication with the companion teat hose or connection 13. This tube section has attaching collars 33 at its ends which snugly fit the bores of the casing-nipples in fluid-sealing relation and spaced flanges 34 are provided thereon which abut the opposing inner faces of the chamber end walls and the ends of the nipples 31. Tubular inserts or adapters 35, 36 are provided for coupling the intake and discharge ends of the tube section to the companion branches of the teat connection, and capillary-like vent passages 37 are provided between these parts at opposite ends of the control unit, as shown in Figure 2, to properly vent the same to the atmosphere after the companion quarter of the cow's bag has been milked out and the tube section 32 contracted, as hereinafter described, to its closed or sealed position, shown in Figure 3, to permit the corresponding teat cup to drop from the cow and the displaced or contracted parts of the control unit to return to their initial or normal position. The insert 35 has its inlet portion slightly converging, as shown, for retarding the flow of milk through the unit to such an extent and between pulsations as to prevent the closing of the tube section 32 and the shutting off of the vacuum to the teat cup during normal milking operations or during such times as the cow may temporarily hold up on her milk.

Applied to diametrically opposite faces of the contractible tube section 32 and between the opposing inner flanges 34 thereof are means for causing its uniform contraction along a transverse plane or line to a closed position when the surge of milk from the cow substantially ceases, such tube section and associated means functioning as a valve to shut off the vacuum to the teat cup. This means preferably consists of flat plates 38, 38 applied to the tube section to move therewith toward and from each other in accordance with the contraction and expansion of the tube-section and having oppositely-facing tube-engaging elements or jaws 39 at one end for pinching and sealing such tube-section in its contracted position shown in Figure 3. These plates may be secured in place by screws 40 applied to attaching plates 41 embedded in the opposite sides of the tube section, as shown in Figure 2, and to properly and uniformly guide the plate-jaws 39 toward and from a shut-off position along a line transversely of the tube section, I provide the opposite ends of the plates 38 with opposing hinge ears 42 joined by companion transverse hinge pivots 43 at the opposite sides of the tube and in an axial plane thereof. Those diametrically opposite sides of the tube section which are crimped or folded upon its contraction are recessed, as indicated at 44, in the transverse intersecting plane of the plate-jaws to reduce the thickness of the tube section at those points.

For the purpose of normally urging the hinged plates 38 with the tube section 32 to their expanded position as well as to function in assisting the contraction of the tube section to its sealed position at a predetermined time during the operation of contraction due to the cow being milked out, I preferably employ coil springs 45 of the compression type at opposite sides thereof. Each spring is interposed between opposing lugs or posts 46 applied to the plates and having its supporting ends 47 pivotally seated in a companion notch or recess 48 formed in the ends of such posts. Further, these notched ends of the posts may be substantially spherical in shape so that the immediately adjoining coils of the spring will be free to ride thereover during the hinging action of the plates while the ends of the springs are free to pivot in such notches. In its normal position, each spring assumes the disposition shown in Figures 2 and 3, with the ends of the posts disposed one below the other in offset relation and with the spring urging the plates to their expanded position. As the tube-section and plates gradually contract in response to a companion quarter of the cow's bag being milked out, the springs are displaced beyond a dead center line position as the ends of the posts 46 assume a relatively reversed position, whereupon such springs then aid in the quick collapse of the tube section to its closed or sealed position shown in Figure 3.

Embedded in the opposite sides of the tube section 32 for a portion of its length and in the plane of its folds when contracted to vacuum sealing position are fine wires 50 which protrude therefrom at one end and are offset outwardly adjacent the recesses 44 to provide forward extensions 51 disposed in laterally spaced relation to the tube wall as seen in Figures 7 and 8. Pendantly pivoted at 52 from the jaw 39 of the upper hinged plate 38 are substantially L-shaped levers 53 whose pendant arms 54 embrace the opposite sides of the tube section and enter and occupy the space between the exterior surface of the tube section and the wire-extensions 51, while the opposing companion arms 55 abut against a stop lug 56 projecting forwardly from such upper plate. Thus, during any contracting movements of the hinged plates with the tube section initiated during the milking operation, the lever-arms 54 rock outwardly to prevent any inward folding of the tube section and consequently cause the opposite sides of the tube section to be distended or creased outwardly rather than folding inwardly and to assure the eventual flatwise contraction of the tube section to the sealed position shown in Figure 5. During the expansion of the hinged plates and the tube section to normal position, the levers 53 are caused to rock inwardly and be restored in reverse fashion to their normal position.

One of the walls of the casing 17 is open to facilitate the unitary assembly of the valve member including the tube section 32, hinged plates 38 and associated parts therein and is normally closed fluid tight by a cover plate 57.

In operation, each control unit operates independently to shut off the vacuum to its teat cup when the companion quarter of the cow's bag is milked out, and at that time the constant vacuum in the system causes the tube section 32 and its hinged plates 38 to contract gradually, first against the tension of the springs 45 and, subsequently to the latter fulcruming around from the position shown in Figure 2 to that shown in Figure 3, with the aid of such springs to finally collapse smartly to the tube-sealed position shown in Figures 3 and 5. During this tube-contracting action, a compensating volume of fluid from the reservoir 21 is discharged in capillary fashion under atmospheric pressure through the vent by-pass 23a and port 22 into the chamber 20 and during this time the diaphragm 27 is correspondingly displaced inwardly. Also, the complementary interengaging tube and hinge plate bearing elements 51 and 53, respectively, compel the outward creasing or folding of the tube to insure its flatwise closing depicted in Figure 5. With the collapse of the tube section 32, the vacuum is cut off to the teat cup, atmosphere is admitted to the opposite ends of the tube section through the vents 37, which results, firstly, in the companion teat cup dropping from the cow and, secondly, in the inflation of the opposite ends of the tube section and its expansion and that of the hinged jaw-plates 38 to their normal positions, the elasticity of the rubber tube section and the springs 45, after being pivotally displaced toward a reversed position, aiding in the return or restoration of the parts to the normal position shown in Figures 2 and 8. During this tube-expanding action, a compensating volume of fluid is forced comparatively quickly from the chamber 20 into the reservoir 21 through the port 22 and the then-opened check valve 24 with the diaphragm 27 being displaced outwardly. With the milking machine in operation and the milk surging through the control unit from the cow to the can, the tube section, and associated parts will expand and contract or fluctuate more or less with the pulsations in the system or tend to collapse should the cow temporarily hold up on her milk, but the capillary flow control of the fluid under atmospheric pressure from the reservoir into the chamber and the springs 45 operate as a time element to prevent the collapsing of the tube section to an area to interfere with the normal milking process. However, when a given quarter is milked out, then the collapsing cycle is allowed to be completed to seal the tube section and permit the companion teat cup to drop automatically from the cow.

In the modified form of the invention shown in Figures 10 and 11, the control unit consists of a casing 58 providing a fluid chamber 59 through which the contractible tube section or valve member 60, with its hinged jaw plates 61, extends. These jaw plates are pivotally joined to each other at opposite sides of the tube section by links 62 which are connected to one end of a horizontally-disposed spring 63 secured at its opposite end to a stud 64 fixed to the companion hinge pivot of the plates. A pair of dash-pot like devices are disposed in the fluid chamber 59 in communication with the fluid therein between the free ends of the plates 61, each device consisting of a cylinder 65 open at its upper end and pivoted at its lower end at 66 to the lower plate and having a plunger 67 operating therein and pivotally connected at 68 to the upper plate. The cylinder has a longitudinal passage 69 in its side opening at its upper and lower ends into such cylinder with the upper end thereof normally covered by the plunger, and the lower end of the cylinder is fitted with a check valve 70. The cylinder 65 is filled with a constant viscosity fluid and the fit of the plunger 67 in the cylinder is such that a capillary flow of the fluid above and below the piston takes place during the fluctuating displacement of the jaw plates 61 during the milking operation. As the companion quarter of the cow's bag is milked out, the cylinder 65 and plunger 67 are gradually moved toward each other in response to the vacuum collapsing of the tube section and as the lower end of the piston approaches the lower end of the cylinder its upper end uncovers the passage 69 thereby causing a quicker discharge of the remaining fluid from the cylinder and the resulting prompt collapse of the tube section and jaw plates to their tube sealing position. The vacuum is then cut off to the companion teat cup, it drops from the cow and the parts return to their normal position. During the restoration of the parts to such position, the check valve 70 opens to recharge the cylinder 65 with fluid.

In the modified form of the valve unit shown in Figure 12, the opposing tube-bearing plates 71, 71 which are secured to the tube in the same manner as are the plates 38 and which contract and expand with the tube 32 are pivotally connected to each other at opposite sides thereof by crossed links 72 each pivoted at one end at 73 adjacent one end of the plates while their opposite ends are connected by a pin 74 and slot 75 to the other ends of such plates. The latter may be normally disposed in a slightly converging fashion so that when the tube is collapsed the converging ends of the plates contract the tube across a transverse line to a closed vacuum sealed position. The sides of the tube have wires 76 thereon to prevent its inward folding, as in the previous construction, but in this modification they are each secured at their free ends to companion semi-circular collars 77 which embrace the tube and terminate at their ends in lugs 78 which abut against each other and prevent the wires and the tube folding inwardly during a collapsing of the tube. In this form, the spring elements between the plates may be omitted, with the inherent elasticity of the rubber tube serving to normally urge the parts to their expanded position.

I claim as my invention:

1. A control device of the character described, comprising a collapsible tube section adapted for communication with a source of liquid and vacuum, means applied to diametrically opposite sides of said tube section and including opposing jaw-like members releasably contractible with and about the same to a closed sealing position, and complementary means in correlation to said tube section applied means and said tube section for compelling the latter to be distended outwardly in external folded fashion during its contraction to a sealing position.

2. A control device of the character described, comprising a collapsible tube section, means applied to diametrically opposite sides of said tube section including opposing jaw-like members hinged to each other at one end for releasable contractible engagement with the tube section, and complementary interengaging means applied to the free end of one of said jaw-like members and said tube section for causing the latter to be distended outwardly in external folds during its contraction to a substantially flattened sealing position.

3. A control device of the character described, comprising a collapsible tube section, means applied to diametrically opposite sides of said tube section including opposing jaw-like members hinged to each other at one end for releasable contractible engagement with the tube section, and interengaging, relatively displaceable elements applied to the free end of one of said jaw-like members and to those sides of the tube section in a plane between such means for holding the tube section laterally outward and preventing the same from folding inwardly upon its contraction to a sealing position.

4. A control device of the character described, comprising a collapsible tube section, means applied to diametrically opposite sides of said tube section including opposing jaw-like members for releasable contractible engagement with the tube section, wire elements paralleling a portion of the length of said tube section in the plane of its folds when contracted and having outwardly offset extensions at one end in spaced relation to the tube section, and relatively displaceable elements on one of said jaw-like members including portions embracing opposite sides of the tube section and projecting between the same and said wire element extensions and adapted to engage the latter.

5. A control device of the character described, comprising a collapsible tube section, means applied to diametrically opposite sides of said tube section including opposing jaw-like members for releasable contractible engagement with the tube section, wire elements paralleling a portion of the length of said tube section in the plane of its folds when contracted and having outwardly offset extensions at one end in spaced relation to the tube section, and levers pivoted on one of said jaw-like members including pendant arms embracing opposite sides of the tube section and projecting between the same and said wire element extensions and adapted to engage the latter and oppositely-facing arms in bearing contact at their opposing ends with such jaw-like member.

6. A control device of the character described, comprising a collapsible tube section, means applied to diametrically opposite sides of said tube section including opposing jaw-like members for releasable contractible engagement with the tube section, the opposite sides of said tube section in the plane of its folds when contracted having outwardly offset extensions thereon, and relatively displaceable elements on one of said jaw-like members including portions embracing opposite sides of the tube section and projecting between the same and its offset extensions and adapted to engage the latter.

7. A control device of the character described, comprising a collapsible tube section, means applied to diametrically opposite sides of said tube section including opposing jaw-like members for releasable contractible engagement with the tube section, and yielding means displaceably interposed between said jaw-like members for normally urging, in one position thereof, such hinge means to an expanded position, and in another position thereof, in the partially collapsed stage of the tube section and its jaw-like members, urging such members to a contracted tube-sealing position.

8. A control device of the character described, comprising a collapsible tube section, means applied to diametrically opposite sides of said tube section including opposing jaw-like members for releasable contractible engagement with the tube section, opposing spring-supporting members applied to said jaw-like members, and a spring disposed between and pivotally supported at its ends on said members to normally urge the jaw-like members to their released position and adapted at a predetermined stage of the collapsing of the tube section to assume a reversed position to urge said members to a contracted tube-sealing position.

9. A control device of the character described, comprising a collapsible tube section, pivotally connected means applied to opposite sides of said tube section to contract therewith and seal the same across a transverse line, and yielding means displaceably interposed between said pivoted means for normally urging the same to an expanded position and in a partially collapsed stage of the tube section, to be displaced to a reversed position for urging said pivoted means to a contracted tube-sealing position.

10. A control device of the character described, comprising a flexible collapsible tube section, hinged means applied exteriorly thereof in substantially embracing relation thereto to move with the tube-walls in response to its contracting and expanding movements and including opposing elements engageable with said tube section to contract the same to a closed position along a transverse line, complementary interengaging means between said hinged means and said tube section for causing the latter to be distended outwardly during its collapse to a sealing position, and spring means to normally urge the latter to an expanded position and displaceable to a reversed tensioning position in a partially contracted position of the hinged means to urge the latter to a final contracted position.

ALBERT G. PERKINS.

References Cited in the file of this patent

UNITED STATES PATENTS

| Number | Name | Date |
|---|---|---|
| 525,816 | Osborn | Sept. 11, 1894 |
| 1,053,933 | Stowe | Feb. 18, 1913 |
| 1,109,800 | Sorensen | Sept. 8, 1914 |
| 1,151,329 | Audett | Aug. 24, 1915 |
| 1,164,304 | Nicewarner | Dec. 14, 1915 |
| 1,387,983 | Hofmeister | Aug. 16, 1921 |
| 1,887,078 | Wheaton | Nov. 8, 1932 |
| 2,183,835 | Foulke | Dec. 19, 1939 |
| 2,212,733 | Grigsby | Aug. 27, 1940 |
| 2,516,029 | Swindin | July 18, 1950 |
| 2,558,152 | Perkins | June 26, 1951 |
| 2,572,658 | Perkins | Oct. 23, 1951 |